March 3, 1964     W. DOUGLASS     3,123,262
FLOW CONTROL DEVICES
Filed Sept. 19, 1960     5 Sheets-Sheet 1
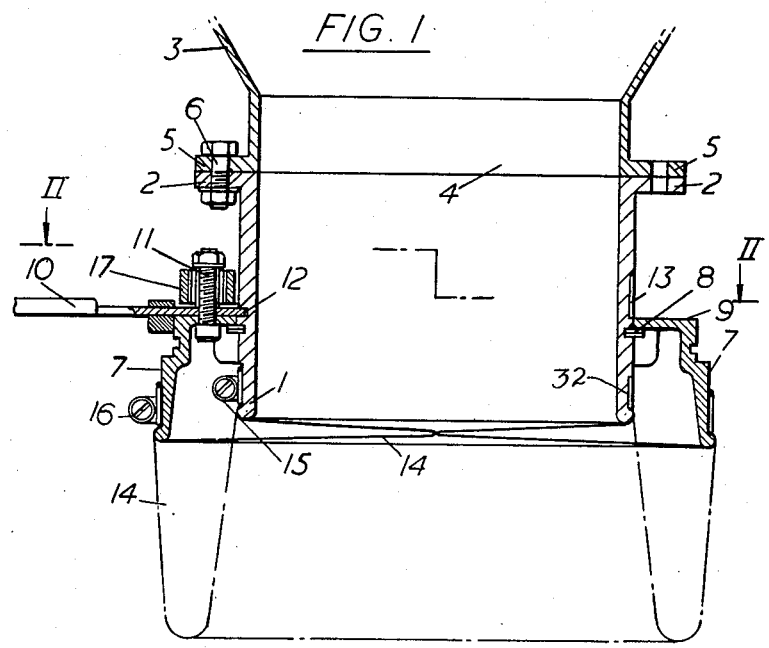
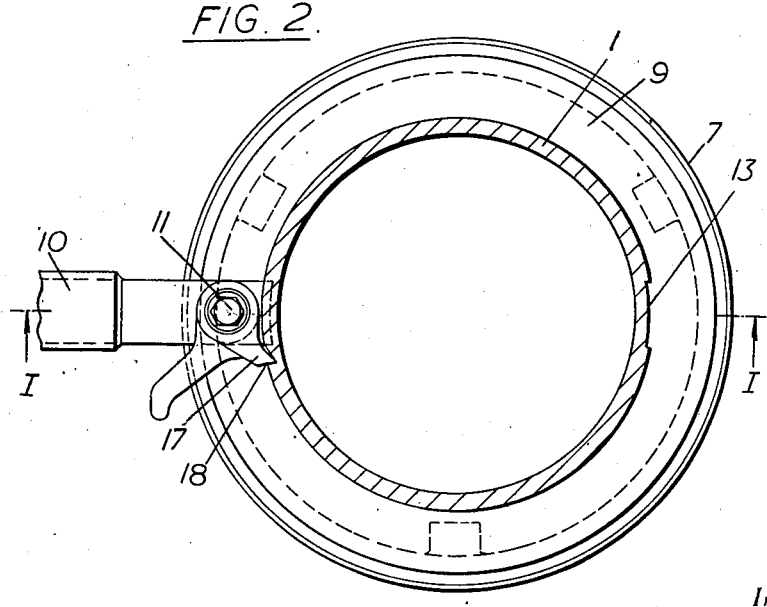
Inventor
WALTER DOUGLASS
By Henderoth, Lindt Ponack
Attorneys March 3, 1964 W. DOUGLASS 3,123,262
FLOW CONTROL DEVICES
Filed Sept. 19, 1960 5 Sheets-Sheet 3
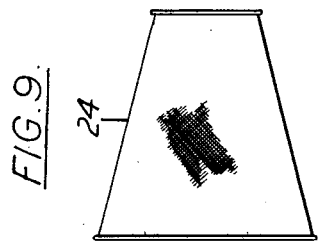
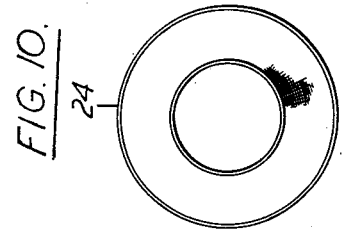
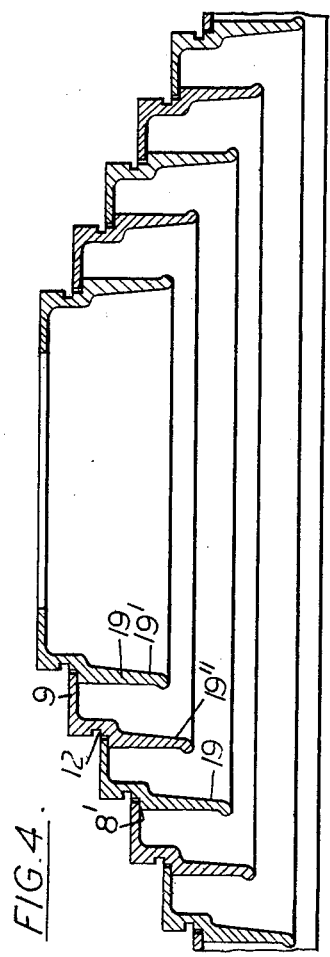
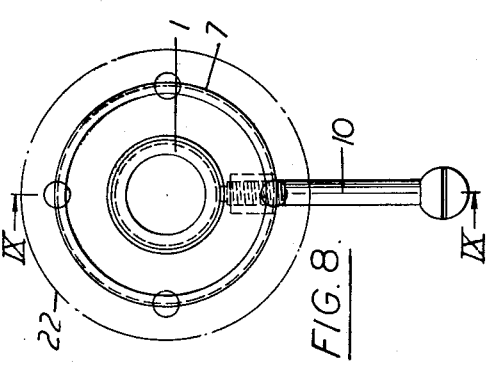
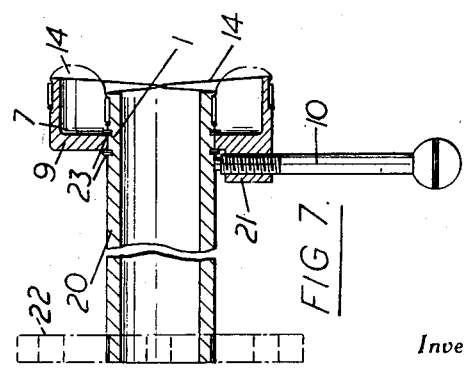
Inventor
WALTER DOUGLASS
By Henderoth, Lind & Ponack
Attorneys Inventor
WALTER DOUGLASS
By Henderoth, Lind & Ponack
Attorneys

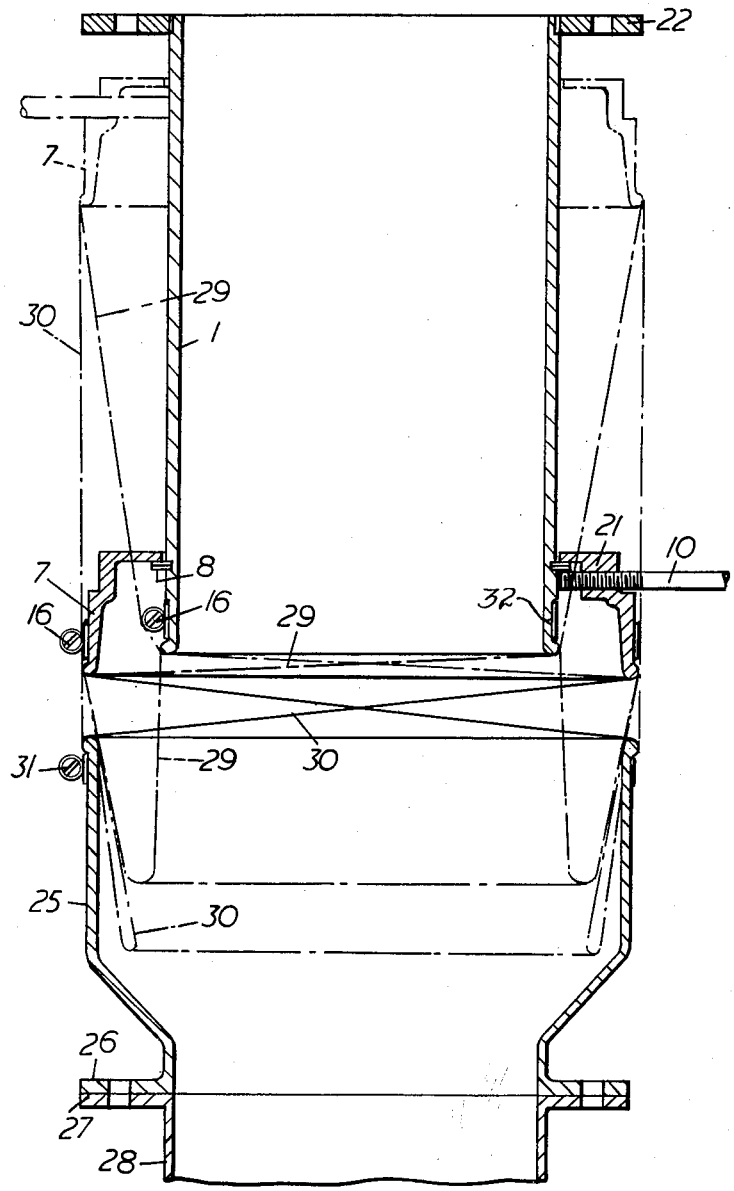

United States Patent Office 3,123,262
Patented Mar. 3, 1964

3,123,262
FLOW CONTROL DEVICES
Walter Douglass, Chorleywood, England, assignor to Mucon Engineering Company Limited, South Ruislip, England, a British company
Filed Sept. 19, 1960, Ser. No. 56,910
Claims priority, application Great Britain Sept. 26, 1959
8 Claims. (Cl. 222—507)

This invention relates to a device for controlling the flow of materials of various kinds, for example finely divided materials and air.

A well-known, highly efficient flow control device comprises a pair of relatively rotatable, co-axially arranged rings and a flexible sleeve folded back on itself, one end of the sleeve being secured to one ring and the other end of the sleeve being secured to the other ring such that upon relative rotation but non-axial movement of the rings the sleeve may be twisted between an open or "flow" position and a closed or "non-flow" position at which the sleeve simulates an iris diaphragm.

Hitherto, it has been usual for flow control devices of the above kind to be composed of four main parts, viz., the two rings, the flexible sleeve and a surrounding body part. This body part represents a major part of the cost of manufacture of the device and has been in the form of a casting having a number of internal, machined seatings for the rings which are disposed within the body part in axially spaced relation. The attachment of the sleeve to the rings and the mounting of the rings in the body part involve the use of a plurality of fixing screws or bolts, such operations being unduly time-consuming. Further, the body part normally has an integrally formed flange by which the flow control device is installed in the position of use.

One object of this invention is to simplify the construction of the above known type of flow control device and to reduce the cost of manufacture through elimination of said body part.

According to this invention a flow control device comprises a normally stationary, inner annular member, an outer annular member rotatably mounted on the device externally of the inner, annular member, a folded-back flexible sleeve, means securing one end of the folded-back sleeve to the inner, annular member, and means securing the other end of the sleeve to the outer, annular member, whereby rotation of the latter in the appropriate direction will cause said sleeve to be twisted between a hanging or "flow" position and a closed or "non-flow" position of use in which the sleeve extends as a twisted, diaphragm-like closure across one end of the inner, annular member.

In the known flow control device above referred to, the flexible sleeve has hitherto been formed from a constant diameter tube, the folded-back ends of the sleeve being secured to the rings from the interior thereof. Consequently, in the open or flow position of the control device, the flexible sleeve hangs down in the path of downward flow of material from an upper hopper or container, to a lower discharge opening of which the control device is fitted. The sleeve is thus exposed to the action of the flowing material which either causes premature wear of the sleeve through abrasion or becomes trapped in puckered parts of the sleeve, this sometimes leading to faulty functioning of the sleeve. Moreover, when the flow control device is used for controlling air flow, the sleeve when open imposes resistance to flow and causes a pressure drop across the device.

In order to overcome the above sleeve disadvantages, the outer annular member of the flow control device according to this invention is preferably radially spaced from the inner annular member and the flexible folded-back sleeve is formed from a tapered tube, whereby when through operation of the outer, annular member the sleeve is substantially untwisted or open, it is disposed substantially out of the path of downward flow of material through the inner annular member when the flow control device is installed in a position of use. This is by virtue of the sleeve occupying its natural length without any puckering.

According to a further and preferred development of this invention the outer, annular member is axially retractable with respect to the inner, annular member to facilitate attachment or detachment of the sleeve or to retract the sleeve completely from the path of flow of said material.

In order that this invention may be more fully understood, together with its advantages, reference will now be made to the accompanying drawings which illustrate, by way of example, several embodiments of the improved flow control device.

FIG. 1 is a sectional elevation on the line I—I, FIG. 2, of the first embodiment shown attached to the lower discharge opening of a container or hopper, shown broken away.

FIG. 2 is a plan view corresponding to FIG. 1 and is a section taken on the line II—II, FIG. 1.

FIG. 4 is a somewhat diagrammatic view illustrating a series of interfitting annular members adapted to be assembled in pairs to form a flow control device substantially according to FIG. 1.

FIG. 7 is a sectional elevation of the third embodiment of flow control device.

FIG. 8 is an end elevation corresponding to FIG. 7 which is a sectional elevation on the line IX—IX, FIG. 8.

FIGS. 9 and 10 are, respectively, a side elevation and an end view of a tapered tube from which the flexible sleeve according to FIG. 8 is formed.

FIG. 11 is a sectional elevation of a double sleeve valve according to this invention.

Figure 3:
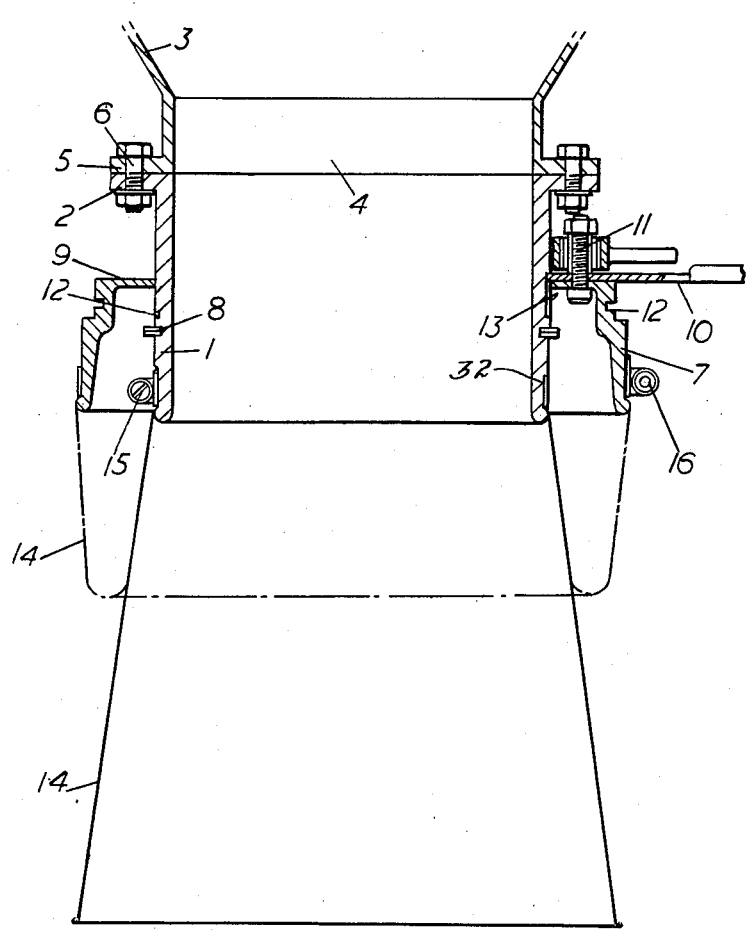
FIG. 3 shows parts of the flow control device according to FIG. 1 in different positions.

The embodiment of flow control device according to FIGS. 1–3 includes an inner annular member 1 having an outwardly directed, radial wall or flange 2 which serves for mounting the control device on the lower end of a vertically mounted container or hopper 3 having a lower discharge opening 4. The wall 2 is secured to a flange 5 of the hopper by screw bolts 6. The flow control device further includes an outer annular member 7 radially spaced from the inner annular member 1 which is provided with a first annular groove in which is positioned circular seating or ring 8 for the inner periphery of a radial wall 9 directed inwardly from the outer annular member 7.

A handle 10 for rotating outer annular member 7 is secured to wall 9 by a screw bolt 11. The inner end of the handle engages in a second peripheral groove 12 in the outer surface of the inner annular member 1. This groove in conjunction with the inner end of the handle normally restrains axial movement of outer annular member 7. With the rotation of the member 7 through 180° from the position shown in FIG. 2, the inner end of handle 10 registers with a vertical slot 13 formed in the outer surface of member 1 and communicating with groove 12. Upon such registration, the annular member 7 can be retracted, as illustrated in FIG. 3. In the relative positions of the annular members 1, 7 shown in FIG. 3, attachment of a flexible sleeve 14 to the flow control device is facilitated. The sleeve 14 is formed from a tapered tube indicated in full lines in FIG. 3. The end of the tube of smaller diameter is fitted over a further groove 32 in the inner annular member 1 and is secured in place by a constricting clip device 15, for example a clip known under the name "Jubilee." The tube is thereafter folded back on itself and the larger diameter end thereof is fitted over the outer annular member 7 and is secured thereto by another constricting clip 16, FIG. 1. The attachment of the sleeve is advantageously effected by first applying an adhesive band to the outer periphery of each annular member at the attachment position, the band being conveniently of textile material coated on both sides with a pressure-sensitive adhesive. Each sleeve end may then be easily attached to the corresponding band and subsequently clamped by clips 15, 16. After fitting the sleeve, the outer annular member 7 is lowered to re-engage the inner end of the handle 10 with slot 13 and finally groove 12. The sleeve 14 then occupies the depending condition indicated in dot-and-dash lines, FIG. 1. This is the fully open or flow position of the sleeve 14 and it will be readily appreciated from FIG. 1 that it is disposed out of the path of downward flow of material from hopper 3 through inner annular member 1. Upon appropriate rotation of outer annular member 7 by means of handle 10, the flexible sleeve 14 is twisted so as progressively to close the flow control device. In full lines in FIG. 1 the sleeve 14 is shown in one of its extreme positions in which it extends as a twisted diaphragm-like closure across the lower end of inner annular member 1. In known manner, a releasable pawl 17 mounted on bolt 11 is engageable with one of a series of notches 18—of which only one is shown in FIG. 2—in the outer periphery of inner annular member 1. The pawl allows the flow control device to be held in any desired position between the fully open and fully closed conditions of the sleeve 14.

According to a development of this invention and to facilitate economic manufacture of flow control devices according to FIGS. 1–3 in different diameters, a series of annular members of identical construction but of different diameters is provided, as diagrammatically illustrated in FIG. 4 which shows a series of annular members 19 assembled together. Each annular member has a circular shoulder 8', groove 12 and inwardly directed, radial wall 9 corresponding to the same-numbered parts on FIG. 1. It will be readily appreciated from FIG. 4 that annular members 19 may be employed in pairs to form a flow control device according to FIG. 1 of a desired size or diameter. Thus, annular members 19' and 19" may be assembled so as to correspond respectively to inner, annular member 1 and outer, annular member 7 of FIG. 1. Annular member 19" and the next annular member 19 of larger diameter may be assembled to form the next size of flow control device, and so on. If desired, grooves 12 may be omitted.

Figure 5:
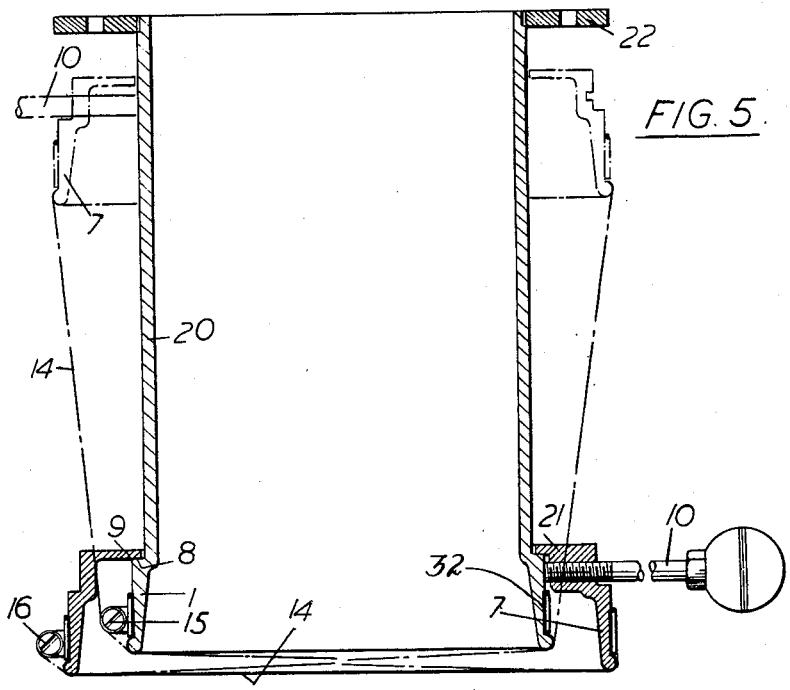
FIG. 5 is a sectional elevation of the second embodiment of flow control device.
Figure 6:
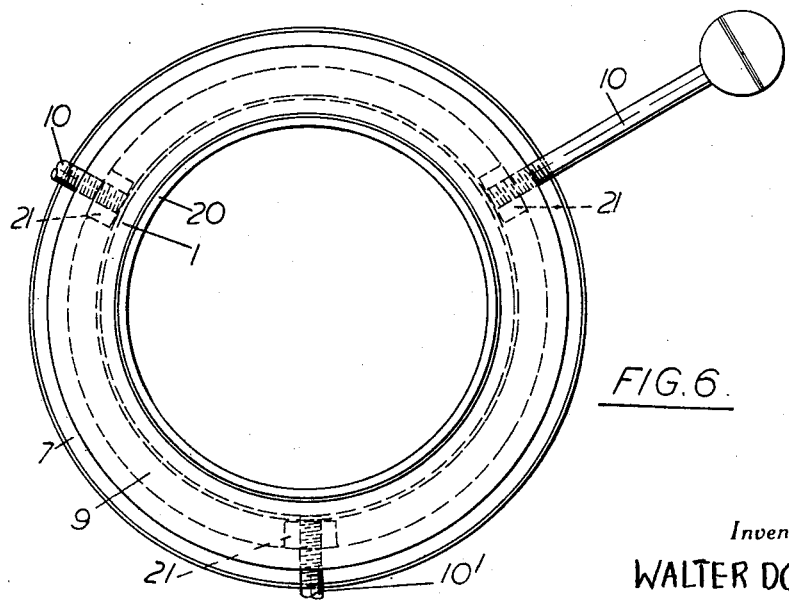
FIG. 6 is a plan view corresponding to FIG. 5.

In the embodiment according to FIGS. 5 and 6, parts similar to those illustrated in FIGS. 1 and 2 are designated with like reference numerals. In this embodiment, however, the inner annular member 1 is formed with a rear, tubular extension 20. The outer annular member 7 rotates on a circular seating 8 and is normally retained against axial movement by detachable screws or the like, not shown, attached to tubular extension 20. Member 7 carries three equidistant radial handles 10 which are screwed into bosses 21 formed integrally with radial wall 9. One handle, designated 10' in FIG. 6, may be screwed and unscrewed into and out of clamping engagement with the outer peripheral surface of inner, annular member 1. In this embodiment, groove 12 of FIG. 1 is omitted. When unclamped, handle 10' may be used to rotate outer annular member 7 for the purpose of regulating flow of material by means of flexible sleeve 14 which is shown in FIG. 5 in its closed position across the lower end of tubular extension 20. With the sleeve 14 adjusted to its fully open position by operation of handles 10, the outer annular member 7 may be retracted on tubular extension 20, as for instance, to the position indicated in dot-and-dash lines, FIG. 5. It is, however, first necessary to remove the retaining screws above referred to. In the retracted position, the sleeve 14 extends between inner, annular member 1 and the retracted, annular member 7. Accordingly, it is fully retracted and disposed out of the path of downward flow of material through tubular extension 20. With the annular member 7 in the fully retracted position, the sleeve 14 is accessible for cleaning and, of course, for easy detachment and replacement. The tubular extension 20 carries a flange 22 by which it may be mounted on to a corresponding flange of a hopper or flow duct for material to be controlled.

The embodiment according to FIGS. 7–10 is somewhat similar to that illustrated in FIGS. 5 and 6 and corresponding parts are designated with like reference numerals. In FIGS. 7 and 8, however, the outer, annular member 7 is axially immovable on tubular extension 20. For this purpose, as indicated in FIG. 7, the inwardly directed, radial wall 9 is located between a pair of rings 23. FIGS. 9 and 10 illustrate a tapered tube 24 from which the sleeve 14, FIG. 8, is formed.

The flexible sleeve 14 is made of a material to suit the nature of material, the flow of which is to be controlled by the device. It may, for example, be composed of fabric or rubber. The embodiment according to FIGS. 7 and 8 is particularly suitable for the employment of a rubber sleeve 14 which has a length in the unstretched condition which is less than the sum of the effective radii of the surfaces of the inner and outer members to which the sleeve is attached, so that when it is attached to annular members 1, 7 and closed, it is under tension and tends to rotate outer member 7 to a position at which unobstructed flow of material through tubular extension 20 takes place. Upon rotation of outer annular member 7 by handle 10, the sleeve 14 is twisted towards its closed condition against the tension in the rubber sleeve so that there is an automatic tendency for the sleeve to return to the fully open position indicated in dotted lines in FIG. 7.

The self-opening effect of the sleeve avoids the need for power or manual operation of the outer annular member 7 for opening the flow control device. The sleeve when tensioned in the partially closed position has desired resistance to pressure of material flowing through the sleeve. The tensioned sleeve allows more accurate control of the valve in that different diameter flow passages formed by the sleeve are accurately reproducible upon rotation of the outer annular member 7 through pre-determined arcs. Any known means may be used to retain member 7 in each position of adjustment.

The embodiment illustrated in FIG. 11 shows a fixed, inner annular member 1 and a rotatable outer annular member 7 substantially similar to the same-numbered parts of FIG. 5. In axial alignment with these members, a fixed annular member 25 is secured by a flange 26 to another flange 27 on a flow duct 28, of which only a part is illustrated. The annular member 25 is substantially of the same diameter as the member 7 and is axially spaced from members 1 and 7 to allow of operation of a double sleeve consisting of two tapered sleeves 29, 30. Sleeve 29, after being folded back on itself, is connected at one end to member 1 and at the other end to member 7 by clips 16. Sleeve 30, after being folded back on itself, is connected at one end to annular member 7 by clip 16 and at the other end to annular member 25 by a constricting clip 31. The sleeves 29, 30 are shown fully open in dotted lines and fully closed in full lines. When annular member 7 is retracted as hereinbefore described, the sleeves occupy the positions shown in dot-and-dash lines in FIG. 11. This double sleeve embodiment of the invention is intended to be installed in a pipe line, sleeve 29 acting as the closure or control part of the device and the other sleeve 30 acting to prevent external leakage of flow material, such as air, through the gap between the members 7, 25.

It will be appreciated that in all the embodiments hereinbefore described, a simplified form of flow control device arises from the omission of the hitherto usual outer valve body made as a casting with internal seatings for a pair of axially aligned rings to which the flexible sleeve is connected. Moreover, as compared with the known form of flow control device, the flexible sleeve in all the embodiments hereinbefore described is substantially disposed out of the path of flow of the material when the sleeve is in the fully open position.

It is to be understood that the invention is not limited to the embodiments hereinbefore described, particularly as to the manner in which the outer, annular member is rotatably mounted on the inner, annular member and the manner of operation of the outer, annular member. In the embodiments described, a handle or handles are employed for manual rotation of the annular member. It will be apparent, however, that an alternative driving means for the outer, annular member could be employed; for instance, a flexible cable or power-driven operating means may be provided, as may be convenient where large diameter flow control devices are employed. Alternatively, automatically operated driving means may be employed particularly if a number of such devices have to operate in synchronism with some other apparatus.

I claim:

1. A flow control device comprising a normally stationary, inner annular member, an outer annular member rotatably mounted externally of the inner member and being radially spaced therefrom and slidable axially thereof from an operative position to a retracted position, a folded-back flexible tapered sleeve, means securing the smaller end of the tapered sleeve to the inner annular member, and means securing the larger, folded-back end of the tapered sleeve to the outer annular member, and means for rotating said outer annular member in said operative position relative to the inner annular member to effect twisting of the tapered sleeve between an open position and a closed position in which the sleeve extends across the inner annular member.

2. A flow control device according to claim 1, wherein the ends of the sleeve are applied to adhesive bands adhesively secured to the annular members and are then clamped in position by clip restricting devices.

3. A device for controlling the flow of materials, comprising a normally stationary inner tubular member having an internal uninterrupted cylindrical flow channel, an outer annular member rotatably mounted on the device externally of the inner member and radially spaced therefrom, a folded back flexible tapered sleeve, the smaller diameter end of which is larger than the diameter of the cylindrical flow channel, means securing the smaller end of the tapered sleeve to the exterior surface of the inner tubular member, and means securing the larger, folded-back end of the tapered sleeve to the outer member, whereby rotation of the outer member in the appropriate direction will cause said sleeve to be twisted from an open position, in which it lies radially outside said flow channel, into a closed position in which the sleeve forms a diaphragm extending across the flow channel.

4. A flow control device according to claim 3, wherein the inner, annular member has a pair of adjacent peripheral grooves, one of said grooves having a ring therein which is rotatably engaged by the inner periphery of an inwardly directed, radial wall on the outer, annular member and the other groove guiding the inner end of a manipulating handle which in conjunction with said second groove prevents axial movement of said outer, annular member.

5. A flow control device according to claim 4, wherein a vertical slot in the outer periphery of the inner, annular member communicates with the second peripheral groove at a position corresponding to the fully open condition of the control device, the inner end of the handle, when in such position, registering with the slot so as to allow the outer, annular member to be retracted axially.

6. A flow control device according to claim 3, including a third annular member in axial alignment with said inner and outer annular members and axially spaced therefrom, and a second flexible sleeve folded back on itself with one end of the second sleeve attached to the outer, annular member and the other end of the second sleeve attached to the said third annular member at the free end thereof.

7. A flow control device, comprising a normally stationary inner cylindrical member having a rear tubular extension, an outer annular member rotatably mounted externally of the inner member and being radially spaced therefrom and slidable rearwardly and axially thereof on said rear tubular extension from an operative position to a retracted position, a folded-back flexible tapered sleeve, means securing the smaller end of the tapered sleeve to the inner member, and means securing the larger, folded-back end of the tapered sleeve to the outer annular member, and means for rotating said outer annular member to effect twisting of the tapered sleeve from an open position to a closed position in which the sleeve forms a diaphragm extending across the inner member.

8. A device for controlling the flow of materials, comprising a normally stationary inner tubular member having an internal uninterrupted cylindrical flow channel, an outer annular member rotatably mounted on the device externally of the inner member and radially spaced therefrom, a folded-back flexible, resilient tapered sleeve, the smaller diameter end of which is larger than the diameter of the cylindrical flow channel and the length of the sleeve in the unstretched condition being less than the sum of the effective radii of the surfaces of the inner and outer members to which the sleeve is attached, means securing the smaller end of the tapered sleeve to the exterior surface of the inner tubular member, and means securing the larger, folded-back end of the tapered sleeve to the outer member, whereby rotation of the outer member in the appropriate direction will cause said sleeve to be twisted from an open, unstretched position in which it lies radially outside said flow channel, into a closed position in which the sleeve is stretched to form a diaphragm extending across the flow channel.

References Cited in the file of this patent

UNITED STATES PATENTS

| | | |
|---|---|---|
| 2,405,682 | Bogoslowsky | Aug. 13, 1946 |
| 2,663,467 | Douglass et al. | Dec. 22, 1953 |
| 2,695,605 | Gibbon | Nov. 30, 1954 |
| 2,846,179 | Monckton | Aug. 5, 1958 |
| 2,857,071 | Kuehne | Oct. 21, 1958 |

FOREIGN PATENTS

| | | |
|---|---|---|
| 592,388 | Great Britain | Sept. 16, 1947 |
| 634,975 | Great Britain | Mar. 29, 1950 |